United States Patent

Sekiguchi

Patent Number: 5,921,637
Date of Patent: Jul. 13, 1999

[54] ANTILOCK BRAKE LIQUID-PRESSURE CONTROL APPARATUS

[75] Inventor: Akihiko Sekiguchi, Saitama, Japan

[73] Assignee: Akebono Brake Industry Co., Ltd., Tokyo, Japan

[21] Appl. No.: 08/701,139

[22] Filed: Aug. 21, 1996

[30] Foreign Application Priority Data

Aug. 21, 1995 [JP] Japan ................... P7-211534

[51] Int. Cl.$^6$ ................... B60T 8/48
[52] U.S. Cl. ................... 303/115.4; 303/116.2
[58] Field of Search ................... 303/113.1, 115.4, 303/116.1, 116.2

[56] References Cited

U.S. PATENT DOCUMENTS

| | | | |
|---|---|---|---|
| 3,666,328 | 5/1972 | Williams | 303/115.5 |
| 3,722,960 | 3/1973 | Menar | 303/115.4 |
| 3,774,976 | 11/1973 | Parsons | 303/115.5 |
| 3,865,440 | 2/1975 | Ostwald | 303/115.4 |
| 3,877,758 | 4/1975 | Kuwana | 303/61 |
| 3,936,095 | 2/1976 | Every | 303/115.4 |
| 4,017,126 | 4/1977 | Ohta | 303/115.4 |
| 4,350,396 | 9/1982 | Mortimer | 303/115.4 |
| 4,492,413 | 1/1985 | Belart et al. | 303/115.4 |
| 4,765,692 | 8/1988 | Miyake | 303/115.4 |
| 4,779,935 | 10/1988 | Kuwana et al. | 303/115.4 |
| 4,865,398 | 9/1989 | Takeuchi et al. | 303/115.1 |
| 4,892,362 | 1/1990 | Takata | 303/115.4 |
| 5,131,729 | 7/1992 | Wetzel | 303/115.4 |
| 5,213,399 | 5/1993 | Burgdorff et al. | 303/115.4 |
| 5,261,730 | 11/1993 | Steiner et al. | 303/115.4 |
| 5,290,098 | 3/1994 | Burgdorf et al. | 303/115.4 |
| 5,322,363 | 6/1994 | Sekiguchi et al. | 303/115.4 |
| 5,330,258 | 7/1994 | Hoshoya et al. | 303/115.4 |
| 5,462,343 | 10/1995 | Yoshida et al. | 303/119.1 |
| 5,509,729 | 4/1996 | Zaviska et al. | 303/115.4 |
| 5,518,306 | 5/1996 | McCann et al. | 303/116.1 |
| 5,590,936 | 1/1997 | Reuter | 303/116.1 |

FOREIGN PATENT DOCUMENTS

| | | | |
|---|---|---|---|
| 3203563 | 8/1983 | Germany | 303/115.4 |
| 62037256 | 2/1987 | Japan | 303/115.5 |
| 63-8057 | 1/1988 | Japan | 303/61 |
| 63297156 | 12/1988 | Japan | 303/115.4 |
| 2200177 | 7/1988 | United Kingdom | 303/115.4 |

*Primary Examiner*—Matthew C. Graham
*Attorney, Agent, or Firm*—Morgan, Lewis & Bockius LLP

[57] ABSTRACT

An antilock brake liquid-pressure control apparatus includes first and second liquid-pressure control mechanisms 3A and 3B, and a liquid-pressure returning mechanism 4. A variable volume chamber 14 of the liquid-pressure control mechanism 3 communicates with the wheel cylinders, and with a primary pressure chamber 2a of a master cylinder through a cut valve 10 which closes its flow path only when an antilock brake control is performed. A liquid-pressure control chamber 13 communicates with a liquid-pressure pump 7 through a hold valve 5, and with a reservoir 8 through a decay valve 6. An input liquid chamber 17 of the liquid-pressure returning mechanism 4 communicates with a discharge port of the liquid-pressure pump. An output liquid chamber 18 thereof communicates with the primary pressure chamber 2a. In a pressure reduction mode of an antilock brake control, the brake liquid is sucked from the liquid-pressure control chamber 13 by the liquid-pressure pump 7, and accumulatively pressurized in the input liquid chamber 17, and the brake liquid is returned from the output liquid chamber 18 to the primary pressure chamber 2a. In a pressure reapplication mode, the brake liquid is supplied from the input liquid chamber 17 to the liquid-pressure control chamber 13, to thereby reapply a pressure to the brake.

18 Claims, 4 Drawing Sheets

ANTILOCK BRAKE LIQUID-PRESSURE CONTROL APPARATUS

BACKGROUND OF THE INVENTION

1. Field of the Invention

The present invention relates to an antilock brake liquid-pressure control apparatus, and more particularly to an antilock brake liquid-pressure control apparatus of the variable volume type which is small in size and low in cost, and does not need, for its construction, a high pressure accumulator, a pressure switch, a large-size reservoir tank, and the like.

2. Related Art

There has been known an antilock brake liquid-pressure control apparatus of the called variable volume type. An example of the antilock brake liquid-pressure control apparatus of this type is disclosed in Japanese Utility Model Publication No. Hei. 5-467. In the liquid-pressure control apparatus disclosed, a cut valve is provided at the midway in a main liquid path, which interconnects a master cylinder and a wheel cylinder. The cut valve is provided for cutting off the main liquid path. A liquid pressure control housing is located closer to the wheel cylinder than to the cut valve. A liquid-pressure control piston is slidably provided in the liquid pressure control housing. The inner space of the liquid pressure control housing is partitioned into a first liquid chamber and a second liquid chamber by the liquid-pressure control piston. The first liquid chamber communicates with the wheel cylinder and the cut valve, and the second liquid chamber is isolated from the first liquid chamber. A liquid pressure in the wheel cylinder is controlled so as to put a slip factor of the wheel within a proper range. To such a control of the liquid pressure, the liquid-pressure control piston is moved forward and backward by increasing or decreasing the liquid pressure in the second liquid chamber under control of an electromagnetic liquid-pressure control valve.

In the antilock brake liquid-pressure control apparatus of the variable volume type as described above, a high pressure accumulator and a pressure switch for monitoring a pressure in the accumulator are indispensably used. Additionally, a large size reservoir tank for holding brake oil must be provided in an antilock brake liquid-pressure control circuit. This results in increase of the size and weight of the apparatus. Further, two control electromagnetic valves, a hold valve and a decay valve, must be used for one brake piping system. The accumulator and the pressure switch are expensive, leading to increase of the cost to manufacture the apparatus.

SUMMARY OF THE INVENTION

Accordingly, an object of the present invention is to provide a novel antilock brake liquid-pressure control apparatus which may be constructed without the high pressure accumulator, the pressure switch, and the large size reservoir tank, and in which the required number of the control electromagnetic valves is reduced to one for each brake piping system, and a secondary pressure chamber of the master cylinder may be constructed using a conventional master cylinder simplified in construction instead of a master cylinder of which the primary pressure chamber must be of the center valve type to effect the antilock brake control. The invention succeeds in reducing the vehicle weight and the cost to manufacture. Further, the brake liquid is returned to the primary pressure chamber 2a of the master cylinder, to thereby prevent the sealing members from being damaged.

To achieve the above object, there is provided an antilock brake liquid-pressure control apparatus in which a liquid-pressure control mechanism is provided in a flow path connecting a tandem type master cylinder and wheel cylinders, and includes a control piston, a variable volume chamber provided at one end of the control piston and connected to the wheel cylinders, a liquid-pressure control chamber provided at the other end of the control piston, and cut valves for cutting off the communicative connection of the master cylinder and the wheel cylinders when the control piston is moved toward the liquid-pressure control chamber by controlling the liquid pressure in the liquid-pressure control chamber. The antilock brake liquid-pressure control apparatus is improved in that first and second liquid-pressure control mechanisms 3A and 3B are respectively provided in a first flow path connecting a primary pressure chamber of the master cylinder and a first wheel cylinder and a second flow path connecting a secondary pressure chamber of the master cylinder and a second wheel cylinder, and a liquid-pressure returning mechanism is provided which includes a returning piston 16, an input liquid chamber 17 provided at one end of the returning piston 16, and an output liquid chamber 18 provided at the other end of the returning piston 16 and connected to the primary pressure chamber, and the input liquid chamber 17 is connected to the discharge port of a liquid-pressure pump 7 for sucking the brake liquid from the liquid-pressure control chambers 13 of the first and second liquid-pressure control mechanisms 3A and 3B in a pressure reduction mode of an antilock brake control, and the liquid-pressure control chambers 13 of the first and second liquid-pressure control mechanisms 3A and 3B.

DESCRIPTION OF THE PREFERRED EMBODIMENTS

The preferred embodiments of the present invention will be described with reference to the accompanying drawings.

Figure 1:
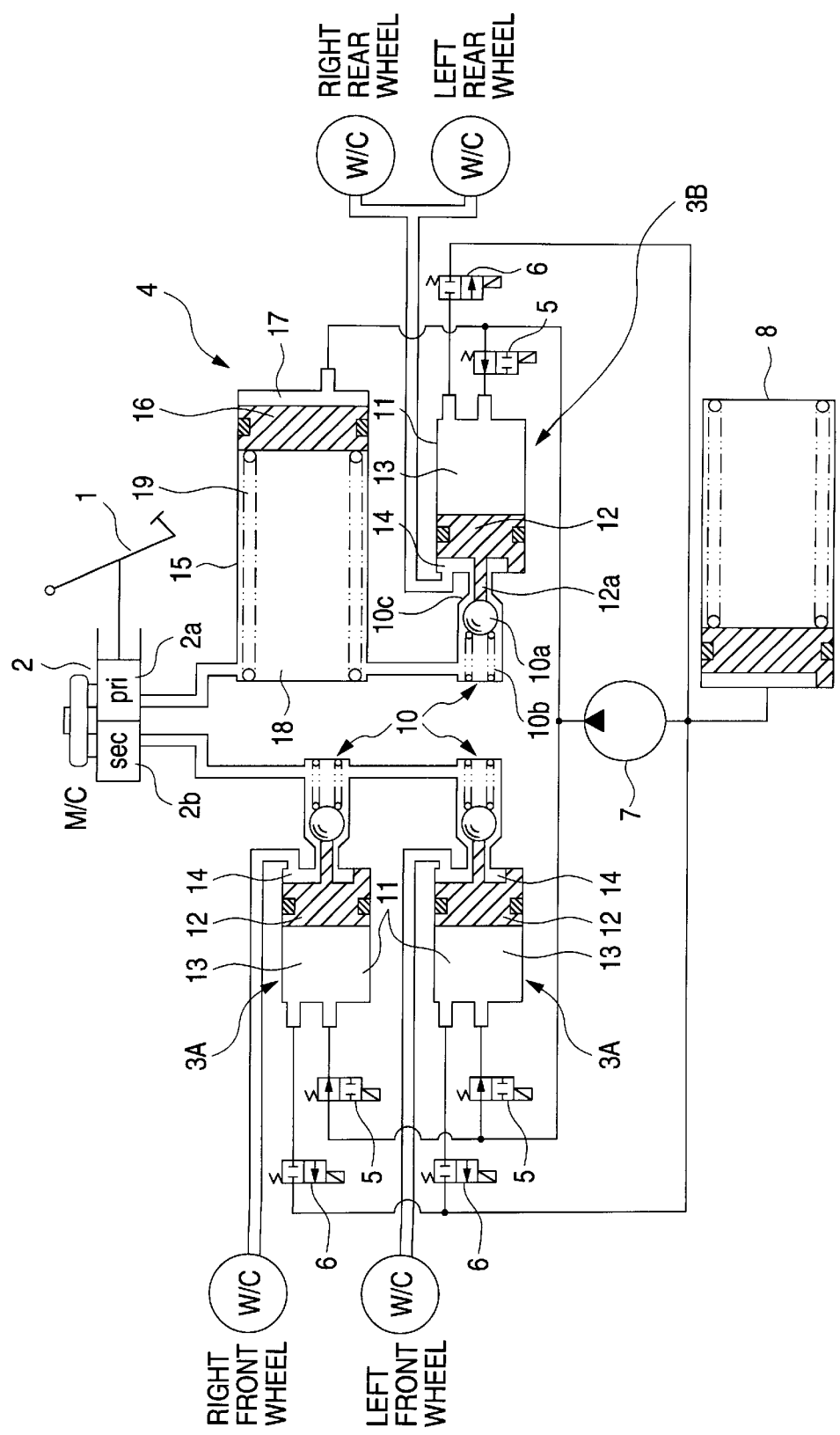
FIG. 1 is a diagram schematically showing an antilock brake liquid-pressure control apparatus according to a first embodiment of the present invention.

FIG. 1 is a diagram schematically showing an antilock brake liquid-pressure control apparatus according to a first embodiment of the present invention. In the figure, there is illustrated brake piping systems connecting a master cylinder to four wheel cylinders. More specifically, as shown, independent piping systems communicating with a secondary pressure chamber of the master cylinder are, respectively, assigned to the right and left front wheel cylinders. A single piping system communicating with a primary pressure chamber is assigned to the right and left rear wheel cylinders. The speed sensor, the electronic control system for controlling the valves, and the like may be conventional ones, and hence those are omitted in the illustration.

In the figure, reference numeral 1 designates a brake pedal; 2, a master cylinder; 3A and 3B, liquid-pressure control mechanisms (to be described in detail later); 4, a liquid-pressure returning mechanism (to be described in detail later); 5, a hold valve as a second liquid-pressure control valve; 6, a decay valve as a first liquid-pressure control valve; 7, a liquid-pressure pump; and 8, a reservoir. The master cylinder 2 is of the known tandem type and provided with a primary pressure chamber 2a and a secondary pressure chamber 2b. The hold valve, the decay valve, the liquid-pressure pump, and the reservoir are also known.

The primary pressure chamber 2a of the master cylinder 2 is communicatively connected to the right and left rear wheels, through the Liquid-pressure returning mechanism 4, the cut valve 10, and the second liquid-pressure control mechanism 3B. The secondary pressure chamber 2b is communicatively connected to the right and left front wheels, through independent routes, one including a cut valve 10 and a first liquid-pressure control mechanism 3A, and the other including another cut valve 10 and another first liquid-pressure control mechanism 3A. Three liquid-pressure control mechanisms 3A and 3B are equal in their constructions, and hence these mechanisms will be generally designated by numeral 3 unless otherwise noted. The piping systems for the right and left front wheels, and the piping system for the right and left rear wheels operate in the same manner for an antilock brake control. Hence, the piping system for the rear wheels will typically be described for simplicity.

In the liquid-pressure control mechanism 3, the control piston 12 is slidably inserted into a cylinder 11 formed in a liquid-pressure control housing. The control piston 12 partitions the inner space of the cylinder 11 into a liquid-pressure control chamber 13 and a variable volume chamber 14. As shown, the liquid-pressure control chamber 13 is communicatively connected to the hold valve 5 and the decay valve 6. The hold valve 5 is communicatively connected to the discharge portion of the liquid-pressure pump 7 and the input liquid chamber 17 of the liquid-pressure returning mechanism 4. The decay valve 6 is communicatively connected to the suction port of the liquid-pressure pump 7 and the reservoir 8. The variable volume chamber 14 of the second liquid-pressure control mechanism 3B communicates with the right and left rear wheels, and communicates with the output liquid chamber 18 of the liquid-pressure returning mechanism 4 through the cut valve 10.

The cut valve 10 is formed of a ball 10a, a valve rod 12a projected from the control piston 12 of the liquid-pressure control mechanism 3, a spring 10b, and a valve seat 10c. In a normal state (shown in FIG. 1), the control piston 12 is positioned as shown by a liquid pressure within the liquid-pressure control chamber 13. In this state, the valve rod 12a of the piston pushes the ball 10a while resisting an urging force of the spring 10b, to thereby allow the variable volume chamber 14 to communicate with the output liquid chamber 18 of the liquid-pressure returning mechanism 4. When the control piston 12 of the liquid-pressure control mechanism 3 is moved toward the liquid-pressure control chamber 13, the ball 10a of the cut valve 10 comes in contact with the valve seat 10c, to thereby cut off the variable volume chamber 14 from the output liquid chamber 18 of the liquid-pressure returning mechanism 4.

In the liquid-pressure returning mechanism 4, a returning piston 16 is slidably inserted into a cylinder 15 formed in the liquid-pressure control housing. The returning piston 16 partitions the inner space of the cylinder 15 into an input liquid chamber 17 and an output liquid chamber 18. The input liquid chamber 17, as described above and illustrated, communicates with the hold valve 5 and the discharge port of the liquid-pressure pump 7. The output liquid chamber 18, as described above, communicates with the cut valve 10, and the primary pressure chamber 2a of the master cylinder 2. The returning piston 16 is constantly urged to the right as shown by a spring 19 located within the output liquid chamber 18.

Figure 4:
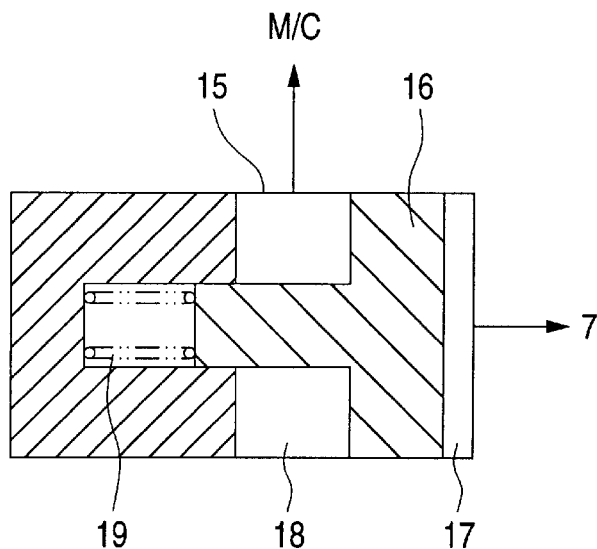
FIG. 4 is a cross sectional view showing another instance of the liquid-pressure returning mechanism.

Another instance of the liquid-pressure returning mechanism 4 is illustrated in FIG. 4. In this instance, the spring contained chamber communicating with the air is separated from the output liquid chamber 18.

The suction port of the liquid-pressure pump 7 is connected to the decay valve 6 and the reservoir 8, as shown. When the antilock brake control is executed, the liquid-pressure pump 7 operates to suck brake liquid from the liquid-pressure control chamber 13 of the liquid-pressure control mechanism 3, through the reservoir 8 or the decay valve 6 being opened. The operation of the liquid-pressure pump 7 and the opening and closing timings of the decay valve when the antilock brake control is executed are known, and not essential to the present invention. Hence, description of them is omitted.

The operations of the antilock brake liquid-pressure control apparatus thus constructed will be described.

Normal Braking Operation

The first and second liquid-pressure control mechanisms 3A and 3B, and the liquid-pressure returning mechanism 4 are put in their states shown. Accordingly, all of the cut valves 10 are open. In the rear wheel brake piping system, the variable volume chamber 14 of the second liquid-pressure control mechanism 3B communicates with the output liquid chamber 18 of the liquid-pressure returning mechanism 4. The output liquid chamber 18 communicates with the primary pressure chamber 2a of the master cylinder 2. The variable volume chambers 14 of the first liquid-pressure control mechanisms 3A in the rear wheel brake piping system communicate with the secondary pressure chamber 2b of the master cylinder 2 through the cut valves 10 being opened. In this state, also in the liquid-pressure control mechanism 3, the liquid-pressure control chambers 13 are filled with brake liquid pressurized at a preset pressure.

Accordingly, when the brake pedal 1 is depressed to brake the wheels, a liquid pressure generated in the primary pressure chamber 2a of the master cylinder 2 is transmitted to the wheel cylinders of the right and left rear wheels, through a route of the output liquid chamber 18 of the liquid-pressure returning mechanism 4→cut valve 10 being opened variable volume chamber 14→those wheel cylinders. A liquid pressure generated in the secondary pressure chamber 2b is transmitted to the wheel cylinders of the right and left rear wheels through a route of the cut valve 10→variable volume chamber 14→those wheel cylinders.

When the brake pedal is released from its depressed state, the brake liquid returns from the wheel cylinders to the master cylinder 2, through the same routes.

Antilock Brake Control

When one of the right and left rear wheels is locked during the braking operation, the sensor (not shown) senses the lock of the rear wheel and sends a signal representative of the lock to the electronic control system. In response to the lock signal, the control system closes the hold valve 5 in the rear wheel piping system while at the same time opens the decay valve 6, and operates the liquid-pressure pump 7.

In turn, the brake liquid in the liquid-pressure control chamber 13, which is partitioned by the control piston 12 of the second liquid-pressure control mechanism 3B, flows into the reservoir 8 by way of the decay valve 6 being opened. The control piston 12 of the second liquid-pressure control mechanism 3B is moved to the liquid-pressure control chamber 13 by the liquid pressure originating from the wheel cylinder. With the movement of the piston, the valve rod 12a of the piston also moves to close the valve rod 12a thereof. Subsequently, the brake liquid flows from the rear wheel cylinders into the variable volume chamber 14, so that the variable volume chamber 14 increases its volume with the movement of the control piston 12, and the liquid pressure to the right and left rear wheels is reduced.

Substantially at the same time, the brake liquid is sucked from the reservoir 8 by the liquid-pressure pump 7, and flows into the input liquid chamber 17 partitioned by the returning piston 16 of the liquid-pressure returning mechanism 4. As the result of the flowing of the brake liquid into the input liquid chamber 17, the returning piston 16 of the liquid-pressure returning mechanism 4 moves while resisting the urging force of the spring 19, and returns the brake fluid from the output liquid chamber 18 to the primary pressure chamber 2a of the master cylinder 2. As described above, in the antilock brake control, the liquid pressure in the wheel cylinders is reduced with the increase of the volume of the variable volume chamber 14, which results from the movement of the control piston 12.

In the antilock brake control, pressure is applied again to the brake in the following manner.

In the pressure reapplication, the hold valve 5 is opened while the decay valve 6 is closed. Also in this state the liquid-pressure pump 7 continues its operation. Accordingly, the liquid-pressure pump 7 is idling and the discharge pressure disappears. As a result, the liquid pressure in the primary pressure chamber 2a of the master cylinder 2 and the urging force of the spring 19 moves the returning piston 16 toward the input liquid chamber 17. The brake liquid which has flowed to the input liquid chamber 17 passes through the hold valve 5 and flows into the liquid-pressure control chamber 13 of the second liquid-pressure control mechanism 3B. Consequently, it moves the control piston 12 of the second liquid-pressure control mechanism 3B toward the variable volume chamber 14. With the movement of the control piston, the brake liquid which has flowed into the variable volume chamber 14 is supplied to the wheel cylinders. In this way, the pressure is applied again to the brake. In the pressure reapplication mode, the control piston 12 of the second liquid-pressure control mechanism 3B is not fully moved the variable volume chamber 14. Accordingly, the cut valve 10 remains closed. The description on the brake control of the rear wheels, which has thus been made, is correspondingly applied to the brake control of the front wheels.

In the embodiment shown in FIG. 1, the variable volume chamber 14 of the second liquid-pressure control mechanism 3B, which is provided for the rear wheels, communicates with the primary pressure chamber 2a, through the cut valve 10 and the output liquid chamber 18 of the liquid-pressure returning mechanism 4. Also in the rear wheels, as in the front wheels, the variable volume chamber 14 of the second liquid-pressure control mechanism 3B is connected through only the cut valve 10 to the primary pressure chamber 2a of the master cylinder 2. In this case, the output liquid chamber 18 of the liquid-pressure returning mechanism 4 is communicatively connected to the primary pressure chamber 2a by another pipe.

As described above, the antilock brake liquid-pressure control apparatus of the embodiment of the present invention can precisely control the brake liquid pressure while varying the volumes of the liquid-pressure control chamber 13 and the variable volume chamber 14 of the liquid-pressure control mechanism 3 through the operations of the liquid-pressure control mechanism 3 and the liquid-pressure returning mechanism 4. In the above-mentioned embodiment, the brake liquid is returned from the output liquid chamber 18 of the liquid-pressure returning mechanism 4 to the primary pressure chamber 2a of the master cylinder 2. Such a mechanism prevents the sealing members used for the floating piston and the push piston, which are located within the master cylinder 2, from being damaged. The reason for this will be described hereinafter.

Figure 5:
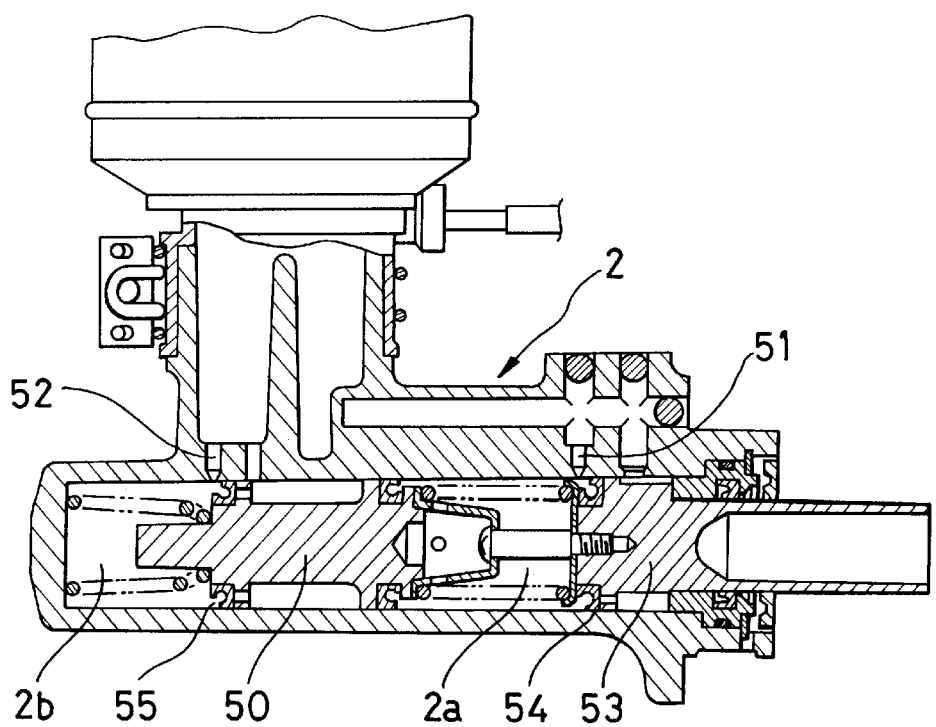
FIG. 5 is a cross sectional view showing a master cylinder of the tandem type.

As shown in FIG. 5, the inner space of the master cylinder 2 of the tandem type is partitioned, by a floating piston 50, into the primary pressure chamber 2a and the secondary pressure chamber 2b. In a nonoperating state, the primary pressure chamber 2a communicates with the reservoir through a hole 51 and the secondary pressure chamber 2b communicates with the same through a hole 52. When the brake pedal is depressed and a push rod piston 53 is moved, a sealing member 54 provided around the push rod piston 53 moves passing the hole 51 and applies a pressure to the primary pressure chamber 2a. Then, the liquid pressure in the primary pressure chamber 2a increases and the floating piston 50 moves. A sealing member 55 provided around the floating piston 50 moves passing the hole 52 and applies a pressure to the secondary pressure chamber 2b. In the master cylinder 2 of the tandem type, if the brake liquid is returned from the output liquid chamber 18 of the liquid-pressure returning mechanism 4 to the secondary pressure chamber 2b when the antilock brake control is active, the floating piston 50 moves toward the initial position, the sealing member 55 around the floating piston 50 moves passing the hole 52. At this time, there is a great chance that the edge of the hole 52 damages the sealing member 55.

In this type of the master cylinder 2, if the brake liquid is returned from the output liquid chamber 18 to the primary pressure chamber 2a, a depressing force of the brake pedal directly acts on the push rod piston 53. If the brake liquid is returned to the primary pressure chamber 2a, the sealing member 54 infrequently passes the hole 51 because of the presence of the depressing force. The result is a less chance that the sealing member 54 is damaged by the hole edge. It is known that the quantity of the movement of the push rod piston 53 is larger than that of the floating piston 50 when the antilock brake control is active. Where the brake liquid is returned from the output liquid chamber 18 to the primary pressure chamber 2a, a distance from the sealing member 54 disposed around the push rod piston 53 to the hole 51 is long. This fact also contributes to the removal of a chance that the sealing member 54 is damaged by the hole 51.

For the above reasons, in the present invention, the brake liquid is returned from the output liquid chamber 18 in the liquid-pressure returning mechanism 4 to the primary pressure chamber 2a.

Figure 2:
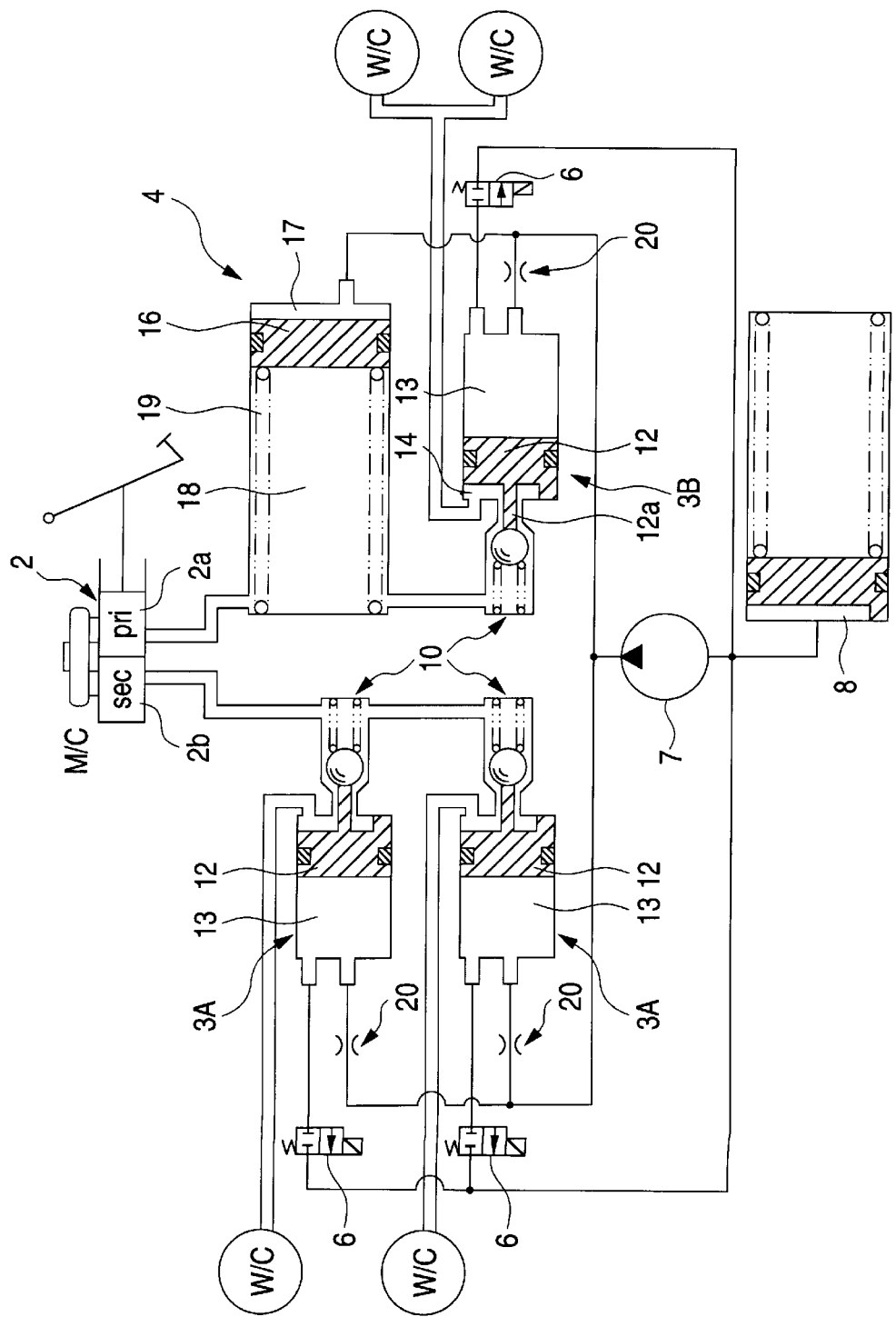
FIG. 2 is a diagram schematically showing an antilock brake liquid-pressure control apparatus according to a second embodiment of the present invention.

A second embodiment of the present invention will be described with reference to FIG. 2.

The second embodiment is different from the first embodiment in that an orifice 20 is used instead of the hold valve. The remaining construction of the second embodiment is substantially the same as of the first embodiment. Therefore, the description limited to only the antilock brake control based on the use of the orifice 20 will be given on the second embodiment.

Antilock Brake Control

When one of the right and left rear wheels is locked during the braking operation, the sensor (not shown) senses the lock of the rear wheel and sends a signal representative of the lock to the electronic control system. In response to the lock signal, the control system opens the decay valve 6 in the rear wheel piping system, end operates the liquid-pressure pump 7.

In turn, the brake liquid in the liquid-pressure control chamber 13, which is partitioned by the control piston 12 of the second liquid-pressure control mechanism 3B, flows into the reservoir 8 by way of the decay valve 6 being opened. The control piston 12 of the second liquid-pressure control mechanism 3B is moved to the liquid-pressure control chamber 13 by the liquid pressure originating from the wheel cylinder. With the movement of the piston, the valve rod 12a of the piston also moves to close the valve rod 12a thereof. Subsequently, the brake liquid flows from the rear wheel cylinders into the variable volume chamber 14, so that the variable volume chamber 14 increases its volume with the movement of the control piston 12, and the liquid pressure to the right and left rear wheels is reduced.

Substantially at the same time, the brake liquid is sucked from the reservoir 8 by the liquid-pressure pump 7, and flows into the input liquid chamber 17 partitioned by the returning piston 16 of the liquid-pressure returning mechanism 4. As the result of the flowing of the brake liquid into the input liquid chamber 17, the returning piston 16 of the liquid-pressure returning mechanism 4 moves while resisting the urging force of the spring 19, and returns the brake fluid from the output liquid chamber 18 to the primary pressure chamber 2a of the master cylinder 2. As described above, in the antilock brake control, the liquid pressure in the wheel cylinders is reduced with the increase of the volume of the variable volume chamber 14, which results from the movement of the piston of the second liquid-pressure control mechanism 3B. At this time, part of the brake liquid discharged from the liquid-pressure pump 7 flows into the liquid-pressure control chamber 13 by way of the orifice 20. However, the amount of the brake liquid flowing into the chamber 13 is small to such a degree as to little affect the amount of the brake liquid.

In the antilock brake control, pressure is applied again to the brake in the following manner.

In the pressure reapplication, the decay valve 6 is closed. Also in this state, the liquid-pressure pump 7 continues its operation and the liquid-pressure pump 7 is idling and the discharge pressure disappears since the decay valve 6 is closed. As a result, the liquid pressure in the primary pressure chamber 2a of the master cylinder 2 and the urging force of the spring moves the returning piston 16 toward the input liquid chamber 17. The brake liquid which has flowed to the input liquid chamber 17 passes through the hold valve 5 and flows into the liquid-pressure control chamber 13 of the second liquid-pressure control mechanism 3B. Consequently, it moves the control piston 12 of the second liquid-pressure control mechanism 3B toward the variable volume chamber 14. With the movement of the control piston, the brake liquid which has flowed into the variable volume chamber 14 is supplied to the wheel cylinders. In this way, the pressure is applied again to the brake.

In the pressure reapplication mode, the control piston 12 of the second liquid-pressure control mechanism 3B is not fully moved the variable volume chamber 14. Accordingly, the cut valve 10 remains closed. The brake liquid is supplied from the input liquid chamber 17 of the liquid-pressure returning mechanism 4 to the liquid-pressure control chamber 13 of the second liquid-pressure control mechanism 3B, through the orifice. Accordingly, the pressure is gently reapplied to the brake.

As described above, the second embodiment uses the orifice instead of the hold valve. Accordingly, the pressure reapplication may gently be performed in the antilock brake control. An exact control of the brake liquid pressure is ensured because of the gentle reapplication of pressure. Further, there is no need of using the hold valve, which is indispensably used in the prior technique. This leads to reduction of cost to manufacture.

Figure 3:
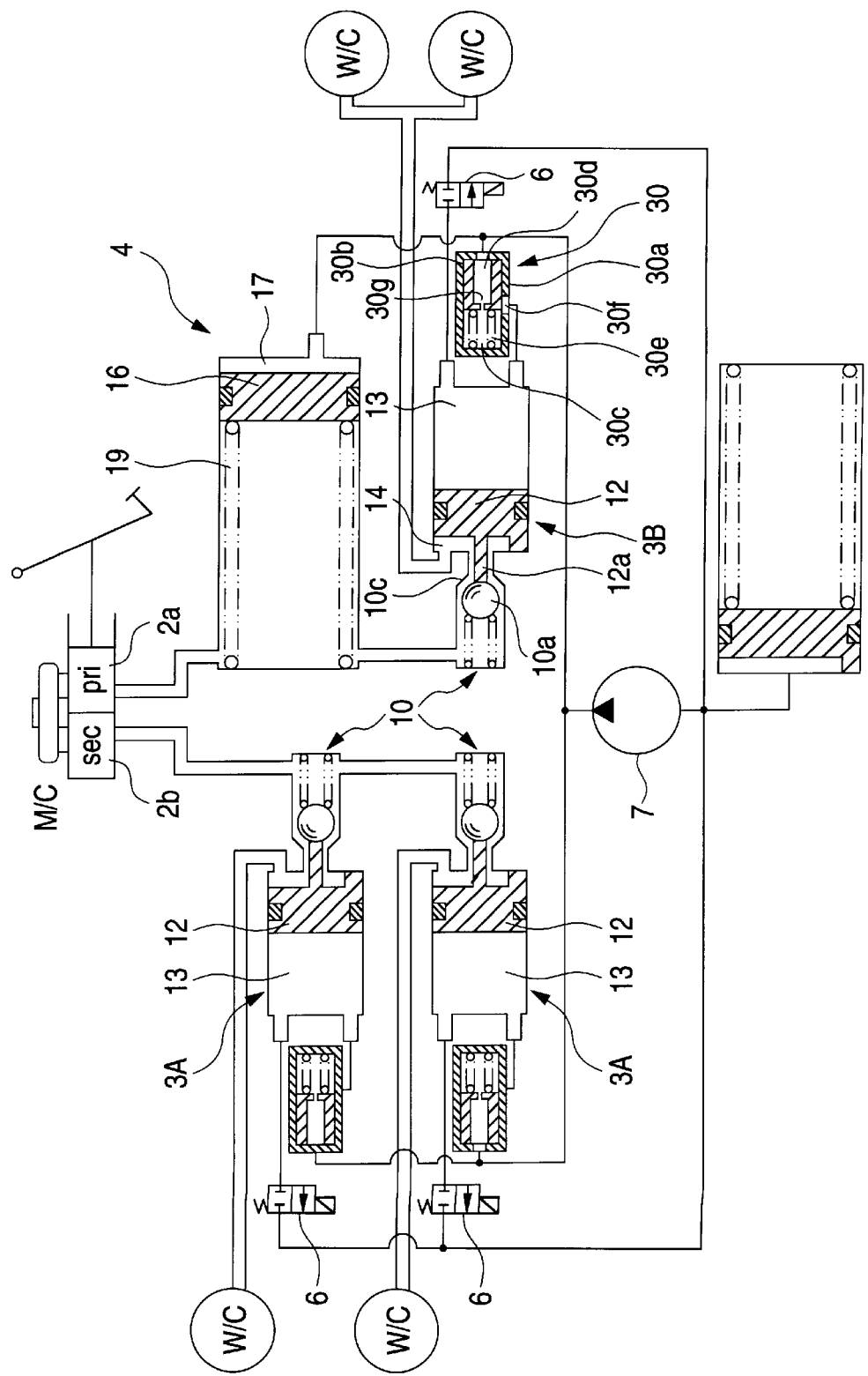
FIG. 3 is a diagram schematically showing an antilock brake liquid-pressure control apparatus according to a third embodiment of the present invention.

A third embodiment of the present invention will be described with reference to FIG. 3.

The third embodiment is different from the first embodiment in that a flow control valve 30 is used instead of the hold valve. The remaining construction of the third embodiment is substantially the same as of the first embodiment. Therefore, the description limited to only the antilock brake control based on the use of the flow control valve 30 will be given on the third embodiment.

The flow control valve 30 supplies a pressure liquid from the liquid-pressure returning mechanism 4 and the liquid-pressure pump 7 to the liquid-pressure control chamber 13 of the liquid-pressure control mechanism 3, always at a fixed pressure gradient when pressure is reapplied to the brake in an antilock brake control. The flow control valve 30 having such a function ensures an exact reapplication of pressure when the antilock brake control is performed. The flow control valve 30 is illustrated in detail in FIG. 3. As shown, the flow control valve 30 is formed of a sleeve 30a, a valve body 30b slidably disposed in the sleeve 30a, a spring chamber 30c and a liquid chamber 30d that are partitioned by the valve body 30b within the sleeve 30a, and a spring 30e, disposed in the spring chamber, for urging the valve body 30b as illustrated. The sleeve has a side port 30f formed therein, an opening area of which is reduced with the movement of the valve body. The valve body 30b has an orifice 30g formed therein. In a state of the flow control valve as shown in FIG. 3, the liquid-pressure control chamber 13 of the second liquid-pressure control mechanism 3B communicates with the discharge port of the liquid pressure pump 7 and the liquid chamber 17 in the liquid-pressure returning mechanism 4 by way of a route of the side port 30f of the sleeve of the flow control valve 30→spring chamber 30c→orifice 30g of the valve body 30b→liquid chamber 30d.

Antilock Brake Control

[Pressure Reduction]

When one of the right and left rear wheels is locked during the braking operation, the sensor (not shown) senses the lock of the rear wheel and sends a signal representative of the lock to the electronic control system. In response to the lock signal, the control system opens the decay valve 6 in the rear wheel piping system, and operates the liquid-pressure pump 7.

In turn, the brake liquid in the liquid-pressure control chamber 13, which is partitioned by the control piston 12 of the second liquid-pressure control mechanism 3B, flows into the reservoir 8 by way of the decay valve 6 being opened. The control piston 12 of the second liquid-pressure control mechanism 3B is moved to the liquid-pressure control chamber 13 by the liquid pressure originating from the wheel cylinder. With the movement of the piston, the valve rod 12a of the piston also moves and the ball 10a comes in contact with the valve seat 10c, to thereby close the cut valve 10. Subsequently, the brake liquid flows from the rear wheel cylinders into the variable volume chamber 14 of the second liquid-pressure control mechanism 3B, so that the variable volume chamber 14 increases its volume with the movement of the control piston 12, and the liquid pressure to the right and left rear wheels is reduced.

Substantially at the same time, the brake liquid is sucked from the reservoir 8 by the liquid-pressure pump 7, and flows into the input liquid chamber 17 partitioned by the returning piston 16 of the liquid-pressure returning mechanism 4. As the result of the flowing of the brake liquid into the input liquid chamber 17, the returning piston 16 of the liquid-pressure returning mechanism 4 moves while resisting the urging force of the spring 19, and returns the brake fluid from the output liquid chamber 18 to the primary pressure chamber 2a of the master cylinder 2. As described above, in the antilock brake control, the liquid pressure in the wheel cylinders is reduced with the increase of the volume of the variable volume chamber 14, which results from the movement of the piston 12 of the second liquid-pressure control mechanism 3B.

In the pressure reduction mode of the antilock brake control, part of the brake liquid that is discharged from the liquid pressure pump 7 returns to the liquid-pressure control chamber 13 of the second liquid-pressure control mechanism 3B, through the side port 30f of the flow control valve 30 and the orifice 30g. In this case, the amount of the brake liquid flowed out of the decay valve 6 is larger than that of the brake liquid from the pump. Accordingly, the brake liquid from the pump little affects the pressure reduction operation. Further, the amount of the brake liquid flowing into the liquid-pressure control chamber 13 is restricted by the orifice 30g, and little affects the amount of the brake liquid fed to the input liquid chamber 17 of the liquid-pressure returning mechanism 4.

[Pressure Reapplication]

In the pressure reapplication mode of the antilock brake control, a command is issued from the electronic control unit, not shown, to the decay valve 6, so that the valve is closed. At this time, the liquid pressure pump 7 still continues its operation. Accordingly, the liquid pressure pump 7 is idling and its discharge pressure drops. As a result, the liquid pressure in the pressure chamber of the master cylinder and the urging force of the spring 19 in the liquid-pressure returning mechanism 4 cooperate to push the returning piston 16 in the mechanism 4 toward the input liquid chamber 17. The brake liquid that has reached the liquid chamber 17 is caused to flow into the liquid-pressure control chamber 13 of the second liquid-pressure control mechanism 3B, through the orifice 30g and the side port 30f in the flow control valve. In turn, the piston 12 in the second liquid-pressure control mechanism 3B moves toward the variable volume chamber 14. In this way, the brake liquid is returned from the variable volume chamber 14 to the wheel cylinder, to thereby perform the pressure reapplication.

When the pressure is reapplied to the brake, the valve body 30b of the flow control valve 30 is moved to the left as viewed in the drawing, by the liquid pressure. In this state, the area of the opening of the side port 30f, which is formed in the sleeve 30a of the flow control valve 30, is reduced. The brake liquid, which has reached the input liquid chamber 17 of the liquid-pressure returning mechanism 4, is supplied to the liquid-pressure control chamber 13 of the second liquid-pressure control mechanism 3B in a state that the flow rate of the brake liquid is reduced by the orifice 30g and the side port 30f. Accordingly, the pressure is gently applied again to the brake. In the pressure reapplication mode, if the pressure in the input liquid chamber 17 of the liquid-pressure returning mechanism 4 is high, the valve body of the flow control valve greatly moves to further reduce the area of the opening of the side port. If the pressure in the input liquid chamber 17 of the liquid-pressure returning mechanism 4 is low, the area of the opening of the side port is reduced to a smaller extent. Thus, a fixed amount of the brake liquid may be supplied to the liquid-pressure control chamber 13 of the second liquid-pressure control mechanism 3B independently of the liquid pressure in the input liquid chamber 17 of the liquid-pressure returning mechanism 4. Therefore, the pressure reapplication can be carried out in a constant and stable state.

As described above, in an antilock brake control, the brake liquid is returned to the primary pressure chamber of master cylinder. Therefore, the sealing members within the master cylinder are not damaged. In a pressure reapplication mode of the antilock pressure control, the brake liquid is returned to the first liquid chamber through the orifice and the flow control valve. Therefore, a precise gentle pressure reapplication is secured. It should be understood that the present invention is not limited to the above-mentioned embodiments, but may variously be modified, altered and changed within the true spirits and scope of the appended claims. For example, the invention is applicable to the X-type brake piping system and the 4-wheel dependent brake piping system.

In the antilock liquid-pressure control apparatus of the invention, there is no need of providing a high pressure accumulator and a pressure switch for monitoring a pressure in the accumulator in the apparatus. Further, no provision of the reservoir tank for holding brake liquid is required in an antilock liquid-pressure control circuit. Additionally, the hold valve, which is indispensable for the conventional apparatus, is not needed for the construction of the apparatus. Accordingly, the antilock liquid-pressure control apparatus of the invention is small in size and low in weight. Since the accumulator, the pressure switch, and the hold valve are not used in the antilock liquid-pressure control apparatus, the cost to manufacture the apparatus is reduced. In an antilock brake control, the brake liquid is returned from the spring contained chamber to the primary pressure chamber of master cylinder. Therefore, the sealing members disposed around the cylinders within the master cylinder are not damaged. Further, since the orifice or the flow control valve is used, pressure may be gently reapplied to the brake in the antilock brake control. Accordingly, the pressure reapplication is more precisely controlled.

What is claimed is:

1. An antilock brake liquid-pressure control apparatus comprising:
   a tandem type master cylinder including:
      a first piston which is moved when a brake pedal is depressed;
      a second piston distanced from the first piston;
      a primary pressure chamber defined between one end of the first piston and one end of the second piston;
      a secondary pressure chamber provided at another end of the second piston;
      a first hole connecting the primary pressure chamber to a reservoir; a second hole connecting the secondary pressure chamber to the reservoir;
      a first sealing member disposed on the first piston for closing the first hole during the brake operation; and
      a second sealing member disposed on the second piston for closing the second hole during the brake operation;
   a first wheel cylinder;
   a second wheel cylinder;
   a first liquid-pressure control mechanism in a first flow path connecting the secondary pressure chamber of the master cylinder and the first wheel cylinder, the first liquid-pressure control mechanism including a first control piston, a first variable volume chamber provided at one end of the first control piston and connected to the first wheel cylinder, a first liquid-pressure control chamber provided at the other end of the first control piston, and a first cut valve for cutting off the communicative connection of the master cylinder and the first wheel cylinder when the first control piston is moved toward the first liquid-pressure control chamber by controlling the liquid pressure in the first liquid-pressure control chamber;

a second liquid-pressure control mechanism in a second flow path connecting the primary pressure chamber of the master cylinder and the second wheel cylinder, the second liquid-pressure control mechanism including a second control piston, a second variable volume chamber provided at one end of the second control piston and connected to the second wheel cylinder, a second liquid-pressure control chamber provided at the other end of the second control piston, and a second cut valve for cutting off the communicative connection of the master cylinder and the second wheel cylinder when the second control piston is moved toward the second liquid-pressure control chamber by controlling the liquid pressure in the second liquid-pressure control chamber;

a single liquid-pressure returning mechanism including a returning piston, an input liquid chamber provided at one end of the returning piston, and an output liquid chamber provided at the other end of the returning piston and connected to the primary pressure chamber; and a liquid-pressure pump having a discharge port and a suction port, wherein the input liquid chamber is connected to the discharge port, the first and second liquid pressure control chambers are directly connected to the suction port of the pump, the pump draws the brake liquid from the first and second liquid-pressure control chambers of the first and second liquid-pressure control mechanisms in a pressure reduction mode of an antilock brake control, and the input liquid chamber is connected to the first and second liquid-pressure control chambers of the first and second liquid-pressure control mechanisms.

2. The antilock brake liquid-pressure control apparatus according to claim 1, further comprising:

a first liquid-pressure control valve, wherein the liquid-pressure control chamber of the liquid-pressure control mechanism is connected to a reservoir and the suction port of the liquid-pressure pump through the first liquid-pressure control valve.

3. The antilock brake liquid-pressure control apparatus according to claim 2, further comprising:

a second liquid-pressure control valve, wherein the liquid-pressure control chamber of the liquid-pressure control mechanism is connected to the input liquid chamber and the discharge port of the liquid-pressure pump through the second liquid-pressure control valve.

4. The antilock brake liquid-pressure control apparatus according to claim 1, further comprising:

an orifice wherein the liquid-pressure control chamber of the liquid-pressure control mechanism is connected to the input liquid chamber and the discharge port of the liquid-pressure pump through the orifice.

5. The antilock brake liquid-pressure control apparatus according to claim 1, further comprising:

a flow control valve having a valve body defining an orifice wherein the liquid-pressure control chamber of the liquid-pressure control mechanism is connected to the input liquid chamber and the discharge port of the liquid-pressure pump through the flow control valve, and wherein the orifice restricts the flow of the brake liquid in accordance with a liquid pressure difference between the input liquid chamber and the liquid-pressure control chamber.

6. The antilock brake liquid-pressure control apparatus according to claim 5, wherein the flow control valve includes a sleeve having a portion defining an opening, a liquid chamber, and a spring chamber, the liquid chamber and the spring chamber being communicatively connected by the orifice, the liquid-pressure control mechanism is connected to the opening, and wherein the valve body moves in the sleeve and blocks the opening at varying degrees during operation.

7. An antilock brake liquid-pressure control apparatus comprising:

a tandem type master cylinder including:
 a first piston which is moved when a brake pedal is depressed;
 a second piston distanced from the first piston;
 a primary pressure chamber defined between one end of the first piston and one end of the second piston;
 a secondary pressure chamber provided at another end of the second piston;
 a first sealing member disposed on the first piston for closing the first hole during the brake operation; and
 a second sealing member disposed on the second piston for closing the second hole during the brake operation;

a wheel cylinder;

a liquid-pressure control mechanism in a flow path communicatively connecting the primary pressure chamber of the master cylinder and the wheel cylinder, the liquid-pressure control mechanism including a control piston having two ends, a variable volume chamber provided at one end of the control piston and connected to the wheel cylinder, a liquid-pressure control chamber provided at the other end of the control piston, and a cut valve for cutting off the communicative connection of the primary pressure chamber of the master cylinder and the wheel cylinder when the control piston is moved toward the liquid-pressure control chamber by controlling a liquid pressure in the liquid-pressure control chamber;

a single liquid-pressure returning mechanism including a returning piston having two ends, an input liquid chamber provided at one end of the returning piston, and an output liquid chamber provided at the other end of the returning piston, the output liquid chamber in a flow path connecting the primary pressure chamber and the variable volume chamber, wherein the cut valve is on the flow path between the output liquid chamber and the variable volume chamber, and wherein the brake liquid is returned to the primary pressure chamber from the output liquid chamber;

a liquid-pressure pump having a discharge port and a suction port, wherein the input liquid chamber is connected to the discharge port, the liquid pressure control chamber is directly connected to the suction port of the pump, and the pump draws the brake liquid from the liquid-pressure control chamber of the liquid-pressure control mechanism in a pressure reduction mode of an antilock brake control, and the input liquid chamber is connected to the liquid-pressure control chamber of the liquid-pressure control mechanism; and a reservoir connected to the suction port of the pump and the liquid pressure control chamber, wherein the master cylinder includes a first hole connecting a primary pressure chamber to the reservoir and a second hole connecting the secondary pressure chamber to the reservoir.

8. The antilock brake liquid-pressure control apparatus according to claim 7, further comprising:

a first liquid-pressure control valve, wherein the liquid-pressure control chamber of the liquid-pressure control mechanism is connected to the reservoir and the suction port of the liquid-pressure pump through the first liquid-pressure control valve.

9. The antilock brake liquid-pressure control apparatus according to claim 8, further comprising:

a second liquid-pressure control valve, wherein the liquid-pressure control chamber of the liquid-pressure control mechanism is connected to the input liquid chamber and the discharge port of the liquid-pressure pump through the second liquid-pressure control valve.

10. The antilock brake liquid-pressure control apparatus according to claim 7, further comprising:

an orifice, wherein the liquid-pressure control chamber of the liquid-pressure control mechanism is connected to the input liquid chamber and the discharge port of the liquid-pressure pump through the orifice.

11. The antilock brake liquid-pressure control apparatus according to claim 7, further comprising:

a flow control valve having a valve body defining an orifice, wherein the liquid-pressure control chamber of the liquid-pressure control mechanism is connected to the input liquid chamber and the discharge port of the liquid-pressure pump through the flow control valve, and the orifice restricts the flow of the brake liquid in accordance with a liquid pressure difference between the input liquid chamber and the liquid-pressure control chamber.

12. The antilock brake liquid-pressure control apparatus according to claim 11, wherein the flow control valve includes a sleeve having a portion defining an opening, a liquid chamber, and a spring chamber, the liquid chamber and the spring chamber being communicatively connected by the orifice, the liquid-pressure control mechanism is connected to the opening, and wherein the valve body moves in the sleeve and blocks the opening at varying degrees during operation.

13. An antilock brake liquid-pressure control apparatus comprising:

a first wheel cylinder and a second wheel cylinder;

a tandem type master cylinder including:
  a first piston which is moved when a brake pedal is depressed;
  a second piston distanced from the first piston;
  a primary pressure chamber defined between one end of the first piston and one end of the second piston;
  a secondary pressure chamber provided at another end of the second piston;
  a first hole connecting the primary pressure chamber to a reservoir;
  a second hole connecting the secondary pressure chamber to the reservoir;
  a first sealing member disposed on the first piston for closing the first hole during the brake operation; and
  a second sealing member disposed on the second piston for closing the second hole during the brake operation;

a first liquid-pressure control mechanism having a control piston, a variable volume chamber provided at one end of the control piston, the variable volume chamber being connected to the first wheel cylinder, a liquid-pressure control chamber provided at another end of the control piston, and a cut valve for cutting off a communicative connection of the master cylinder and the first wheel cylinder when the control piston is moved toward the liquid-pressure control chamber by controlling liquid pressure in the liquid-pressure control chamber, the first liquid-pressure control mechanism being provided in a first flow path connecting the primary pressure chamber to the first wheel cylinder;

a second liquid-pressure control mechanism having a control piston, a variable volume chamber provided at one end of the control piston, the variable volume chamber being connected to the second wheel cylinder, a liquid-pressure control chamber provided at another end of the control piston, and a cut valve for cutting off a communicative connection of the master cylinder and the second wheel cylinder when the control piston is moved toward the liquid-pressure control chamber by controlling liquid pressure in the liquid-pressure control chamber, the second liquid-pressure control mechanism being provided in a second flow path connecting the secondary pressure chamber to the second wheel cylinder;

a single liquid-pressure returning mechanism, the liquid-pressure returning mechanism located in the first flow path and comprising a returning piston, an input liquid chamber provided at one end of the returning piston, and an output liquid chamber provided at another end of the returning piston, the output liquid chamber being connected to the primary pressure chamber; and a liquid-pressure pump for pumping the brake liquid of the liquid-pressure control chambers of the first and second liquid-pressure control mechanisms into the input liquid chamber of the liquid-pressure returning mechanism in a pressure reduction mode of an antilock brake control.

14. The antilock brake liquid-pressure control apparatus according to claim 13, further comprising:

a first liquid-pressure control valve, wherein the liquid-pressure control chamber of each of the first and second liquid-pressure control mechanism is connected to a reservoir and a suction port of the liquid-pressure pump through the first liquid-pressure control valve.

15. The antilock brake liquid-pressure control apparatus according to claim 14, further comprising:

a second liquid-pressure control valve, wherein the liquid-pressure control chamber of each of the first and second liquid-pressure control mechanism is connected to the input liquid chamber and a discharge port of the liquid-pressure pump through the second liquid-pressure control valve.

16. The antilock brake liquid-pressure control apparatus according to claim 13, further comprising:

an orifice, wherein the liquid-pressure control chamber of each of the first and second liquid-pressure control mechanism is connected to the input liquid chamber and a discharge port of the liquid-pressure pump through the orifice.

17. The antilock brake liquid-pressure control apparatus according to claim 13, further comprising:

a flow control valve having a valve body defining an orifice, wherein the liquid-pressure control chamber of each of the first and second liquid-pressure control mechanism is connected to the input liquid chamber and a discharge port of the liquid-pressure pump through the flow control valve, and wherein the orifice restricts the flow of the brake liquid in accordance with a liquid pressure difference between the input liquid chamber and the liquid-pressure control chamber.

18. The antilock brake liquid-pressure control apparatus according to claim 17, wherein the flow control valve includes a sleeve having a portion defining an opening, a liquid chamber, and a spring chamber, the liquid chamber and the spring chamber being communicatively connected by the orifice, the liquid-pressure control mechanism is connected to the opening, and wherein the valve body moves in the sleeve and blocks the opening at varying degrees during operation.

\* \* \* \* \*